United States Patent [19]

Qualheim

[11] 3,781,939
[45] Jan. 1, 1974

[54] GLASS WASHER FOR BEVERAGE GLASSES AND THE LIKE
[76] Inventor: Harold J. Qualheim, 641 Tower Cir., Racine, Wis. 53402
[22] Filed: Aug. 17, 1972
[21] Appl. No.: 281,422

[52] U.S. Cl. .................................................. 15/76
[51] Int. Cl. .......................... A47l 15/38, B67c 1/08
[58] Field of Search ........................... 15/56, 65–67, 15/71, 74, 75, 76, 101

[56] References Cited
UNITED STATES PATENTS
| | | | |
|---|---|---|---|
| 2,153,238 | 4/1939 | Cunningham | 15/76 |
| 2,221,442 | 11/1940 | Cunningham | 15/74 |
| 2,772,429 | 12/1956 | Lyman | 15/76 |
| 3,011,192 | 12/1961 | Delamater | 15/74 |

Primary Examiner—Edward L. Roberts
Attorney—Axel H. Johnson

[57] ABSTRACT

A glass washer for use in washing beverage glasses and the like, comprising a washer unit having multiple rotating brushes, and mounted in a sink, and submerged in the washing solution. The means of rotating the brushes comprises a drive unit positioned under the sink, which unit has a shaft extending upwardly therethrough to engage the washer unit. The washer unit is portable to permit convenient removal from the sink for cleaning and servicing. Downwardly extending means on the washer unit engages corresponding fixed means to prevent rotation of the body of the washer unit when in operation.

5 Claims, 6 Drawing Figures

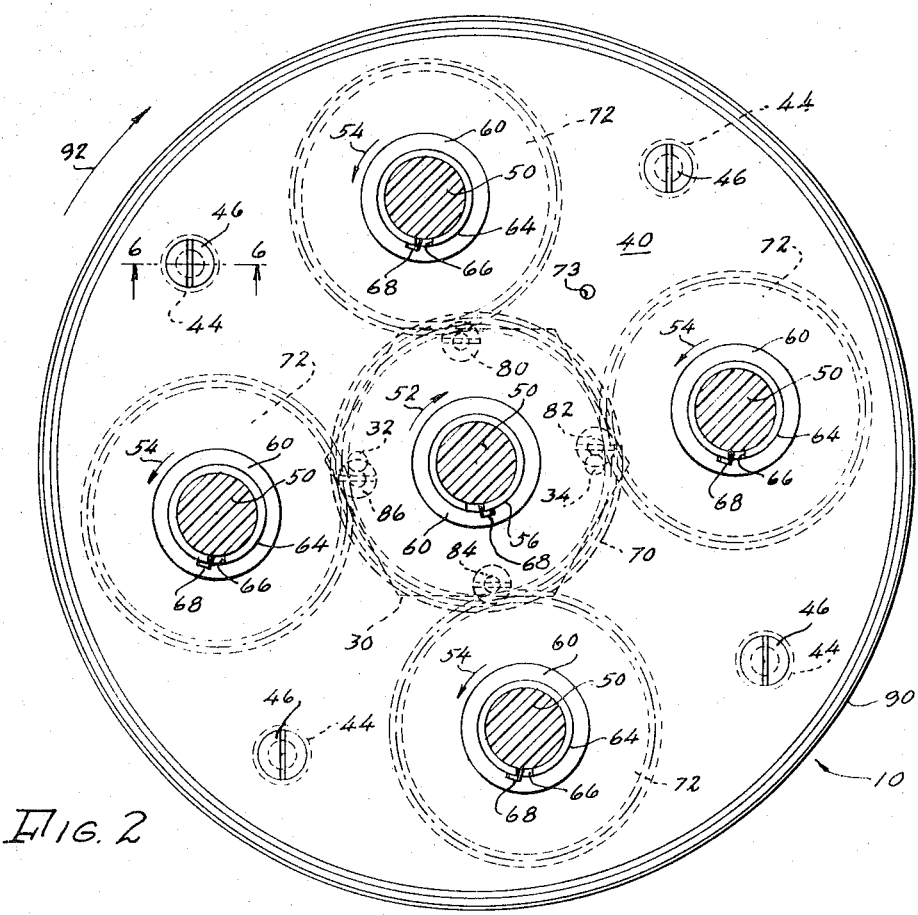
Fig. 2
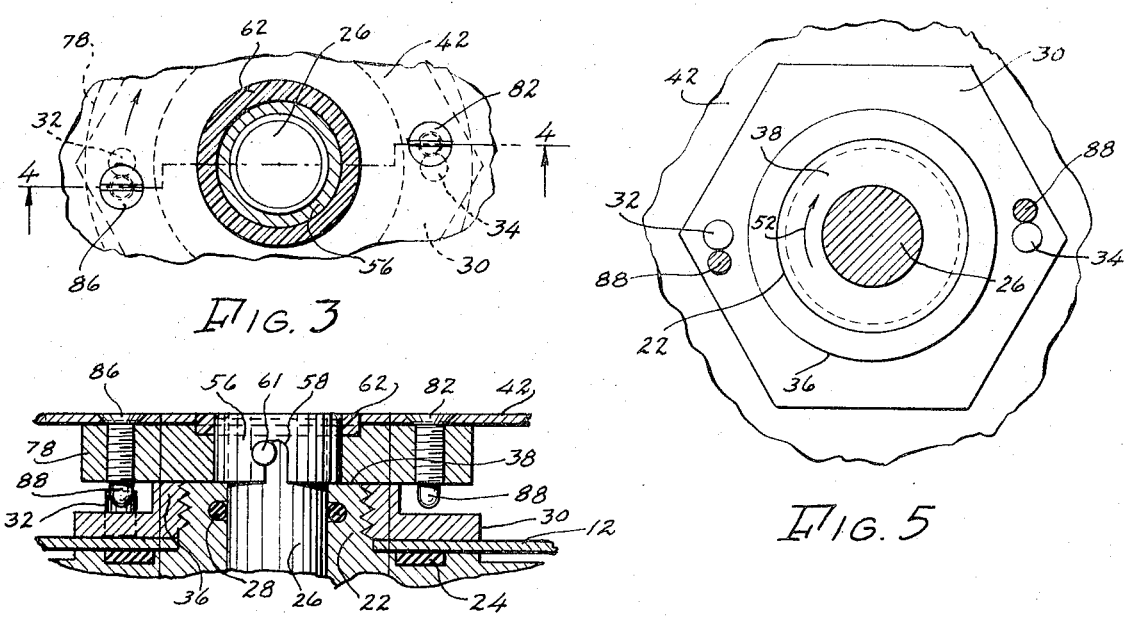
Fig. 3
Fig. 4
Fig. 5

GLASS WASHER FOR BEVERAGE GLASSES AND THE LIKE

BACKGROUND OF THE INVENTION

1. Field of the Invention

This invention concerns a glass washer having rotating brushes, and which is mounted in a sink. The motor employed to rotate the brushes is mounted under the sink and is provided with an upwardly-extending shaft that extends through the bottom of the sink.

2. Description of the Prior Art

Prior art devices of this nature have a motor positioned above the sink adjacent to the brush unit, and which motor is an integral part of the washer.

SUMMARY OF THE INVENTION

This invention concerns a glass washer for use in restaurants and similar establishments, and is mounted in a suitable sink to wash drinking glasses, sherbert glasses and similar deep glassware.

The washer unit comprises elongated rotating brushes that extend upwardly, and which are substantially submerged in the washing solution.

The drive unit comprises a motor and a gear reduction unit which is mounted under the sink, and which unit is provided with a shaft that extends upwardly through the sink to engage the washer unit. An object of this invention is to provide a sink-mounted glass washer driven by a motor unit mounted under the sink for safety against electrical hazards in the event of malfunctioning.

Another object is to provide a portable glass washer that is conveniently removable from the sink for cleaning or servicing.

Further objects and advantages of this invention will become apparent from a consideration of the following detailed description. It is, however, to be understood that the invention is not to be limited to the details disclosed, but includes all such variations as fall within the spirit of the invention.

Referring to the drawings:

FIG. 2 is a view taken in a horizontal plane at 2—2 of FIG. 1.

FIG. 3 is a view taken at 3—3 of FIG. 1.

FIG. 4 is a section taken at 4—4 of FIG. 3.

FIG. 5 is a section taken at 5—5 of FIG. 1.

FIG. 6 is a section taken at 6—6 of FIG. 2.

Figure 1:
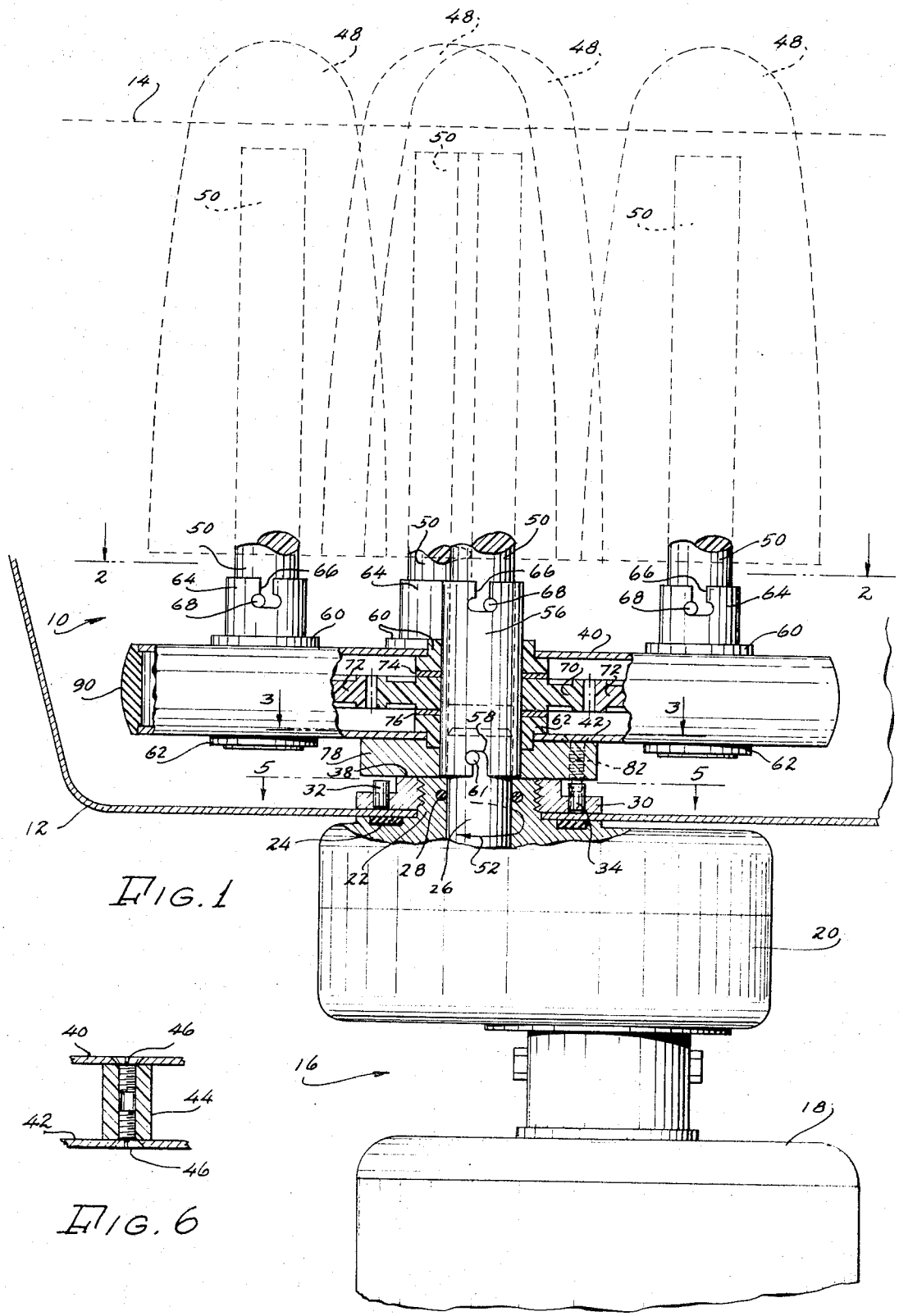
FIG. 1 is an elevational view of the complete washer assembled for use and with portions removed to show details.

The washer unit 10 is portable and is positioned on the bottom of a sink 12, which sink is of a depth to permit submerging the unit in a washing solution to the approximate depth indicated at 14.

The independent drive unit 16 is positioned under the sink 12 and comprises a suitable motor 18 integral with a conventional gear reduction unit 20 to provide a suitable rate of rotation for the brushes.

Describing the unit 16 in detail; unit 20 terminates upwardly in a threaded boss 22 which passes through a suitable aperture in the bottom of the sink 12. A circular gasket or sealing member 24 abuts the under surface of sink 12 to prevent water reaching the drive unit 16. A drive shaft 26 extends upwardly through the boss 22 and is journalled therein. An O-ring 28 is provided around shaft 26 to prevent water entering the reduction unit 20. Drive unit 16 is secured to the sink 12 by a hexagonal nut 30 having a thread that engages a corresponding thread on boss 22; nut 30 engaging the upper surface of sink 12. Nut 30 is provided with upwardly extending stop pins 32 and 34 for a purpose which will be made clear. Nut 30 is also provided with a cylindrical portion 36 which terminates upwardly in a horizontal surface 38 as a means to support the washer unit when in operation.

Washer unit 10 comprises an upper plate 40 and a lower plate 42 of circular shape, and which plates are spaced apart vertically by suitable posts 44 and secured by screws 46. In this instance, five bristle brushes 48 (shown by dotted lines in FIG. 1) are provided, having non-metallic cores 50, and which brushes rotate in the directions indicated by arrows in FIG. 2. The center brush rotates in the direction of arrow 52 while the other brushes rotate in the direction of arrows 54. It is to be understood that the direction of rotation is not important, and can be reversed if the situation so dictates. A drive sleeve 56 slidingly fits over shaft 26 and comprises the portable connecting means between the washer unit and the drive unit. A bayonet slot as at 58 engages a pin 61, integral with shaft 26 to cause rotation of the sleeve 56 in the direction of arrow 52. Bushings 60 and 62 are of non-metallic material and are mounted against rotation in plates 40 and 42 respectively, and which provide bearings for the sleeve 56. Similar bushings 60 and 62 are provided for the four rotating sleeves 64 positioned radially outwardly from the sleeve 56. A brush core 50 is fitted to each of the sleeves 56, and the four identified as 64. Sleeves 64 terminate substantially at the lower face of bushings 62.

Shanks 50 are a sliding fit in their sleeves 56 and 64, and which sleeves are provided with dual-directional bayonet slots 66. Pins 68 in shanks 50 of brushes 48 will rotate with their respective sleeves 56 and 64.

A center drive gear 70 of non-metallic material is positioned between plates 40 and 42, and is fixed to sleeve 56 so as to turn therewith. Similar gears 72, of which there are four, mesh with gear 70 and which gears are also secured to their respective sleeves 64. Metal washers 74 and 76 are interposed between bushings 60 and 62, and gears 70 and 72, to prevent galling between the bushings and the gears. Holes such as 73 are provided in plates 40 and 42 to permit water to reach the gears and provide lubrication in that they are non-metallic.

The gist of this invention comprises the means of preventing rotation of the portable washer unit 10 with the shaft 26 while the washer is in operation. A disk 78 is positioned on the underside of the plate 42 and freely receives sleeve 56. A plurality of screws 80, 82, 84 and 86, shown in FIG. 2, pass through plate 42 and are countersunk therein. These screws secure disk 78 integrally to the plate 42. Screws 80 and 84 terminate at the lower surface of disk 78, while screws 82 and 86 are provided with downwardly extending stud portions 88 as shown in FIG. 4. A circumferentially directed sealing belt 90, as shown in FIGS. 1 and 2, surrounds the periphery of plates 40 and 42 to exclude debris and foreign matter from the space between the plates.

When the portable washer unit is placed over the shaft 26 as shown in FIG. 1, and is in operation, the shaft 26 and its attached brush 48 will rotate in the direction of arrow 52, because of engagement of pin 61 with slot 58. Gear 70 will then rotate gears 72 with their sleeves 64 and attached brushes 48 in the direction of arrows 54. Because of the torque due to friction, there will be a rotational force tending to rotate the washer unit 10 with the shaft 26, rather than limited merely to the brushes 48.

The gist of the invention substantially comprises the provision of the rotational abutment of stud portions 88 with the stop pins 32 and 34, thereby preventing the rotation of washer unit 10 in the direction of arrow 92 of FIG. 2. The result being that all rotational motion will be confined to that required to rotate the brushes 48. The washer unit 10, however, is free to be lifted upwardly to disengage it from the shaft 26 for cleaning or servicing merely by disengagement of sleeve 56 from the shaft 26, and the bayonet slot 58.

The above being a complete description of an illustrative embodiment of the invention, what is claimed as new and desired to be secured by Letters Patent of the United States is:

1. A glass washer comprising a portable brush unit positionable in a sink and having a body portion with rotatable brushes thereon, a drive unit positioned below the sink and integrally fixed thereto, said drive unit having a drive means extending upwardly through an opening in said sink and rotatable about an axis, said body portion having a brush-rotating means axially engageable with said drive means, downwardly extending stop means integrally fixed to said body portion and positioned radially from said axis, upwardly extending means integrally fixed to said drive unit and positioned radially from said axis and circumferentially engageable with said downwardly-extending stop means to prevent rotation of said body portion about said axis in response to rotation of said drive means.

2. A glass washer as set forth in claim 1, in which said downward-extending stop means comprise cylindrical members.

3. A glass washer as set forth in claim 2, in which said cylindrical members have spherical terminal portions.

4. A glass washer as set forth in claim 1, in which said upwardly extending means comprise cylindrical members.

5. A glass washer as set forth in claim 1, in which said drive unit terminates upwardly in a boss, said boss having an external thread, a nut threadedly engaging said boss and abutting the upper surface of said sink, said upwardly extending means positioned integrally in said nut.

* * * * *